United States Patent [19]

Giallanza

[11] Patent Number: 4,463,545
[45] Date of Patent: Aug. 7, 1984

[54] TOOL AND METHOD FOR PICKING FRUIT

[76] Inventor: Sam J. Giallanza, 8207 E. Coolidge, Scottsdale, Ariz. 85251

[21] Appl. No.: 475,139

[22] Filed: Mar. 14, 1983

[51] Int. Cl.³ ............................................ A01D 46/24
[52] U.S. Cl. ....................................... 56/337; 56/338; 56/339
[58] Field of Search ................. 56/332, 333, 335, 337, 56/338, 339

[56] References Cited

U.S. PATENT DOCUMENTS

| 190,267 | 5/1877 | Berans | 56/337 |
| 681,203 | 8/1901 | Eddy | 56/337 |
| 838,131 | 12/1906 | Murdoch | 56/332 |

FOREIGN PATENT DOCUMENTS 198993 1/1958 Fed. Rep. of Germany ........ 56/338

Primary Examiner—Gene Mancene
Assistant Examiner—David I. Tarnoff
Attorney, Agent, or Firm—Harry M. Weiss

[57] ABSTRACT

An improved apparatus for picking fruit by severing the fruit from an associated stem is disclosed. The apparatus includes an elongate handle for handling and extending the apparatus to reach the fruit. An elongate bracket bar is fastened to the extended end of the handle. A cutting blade is formed at the uppermost end of the bracket bar. A guide-arm is slidably coupled to the bracket bar. A toothed guide-head is attached to the uppermost end of the guide-arm and includes an upper tooth and a spaced lower tooth which define a stem channel through which the stem of the fruit is guided. The sliding action of the guide-arm is controlled by a raising string which elevates the guide-arm to an extending position, and a lowering string which returns the guide-arm to a retracted position. As the guide-arm, hence the fruit positioned in the stem channel, is lowered, the stem contacts the cutting blade of the bracket bar, which results in the severing of the fruit from the associated stem. A storage basket may be attached to the handle for collecting and storing the fruit as it is severed from the stem.

2 Claims, 6 Drawing Figures

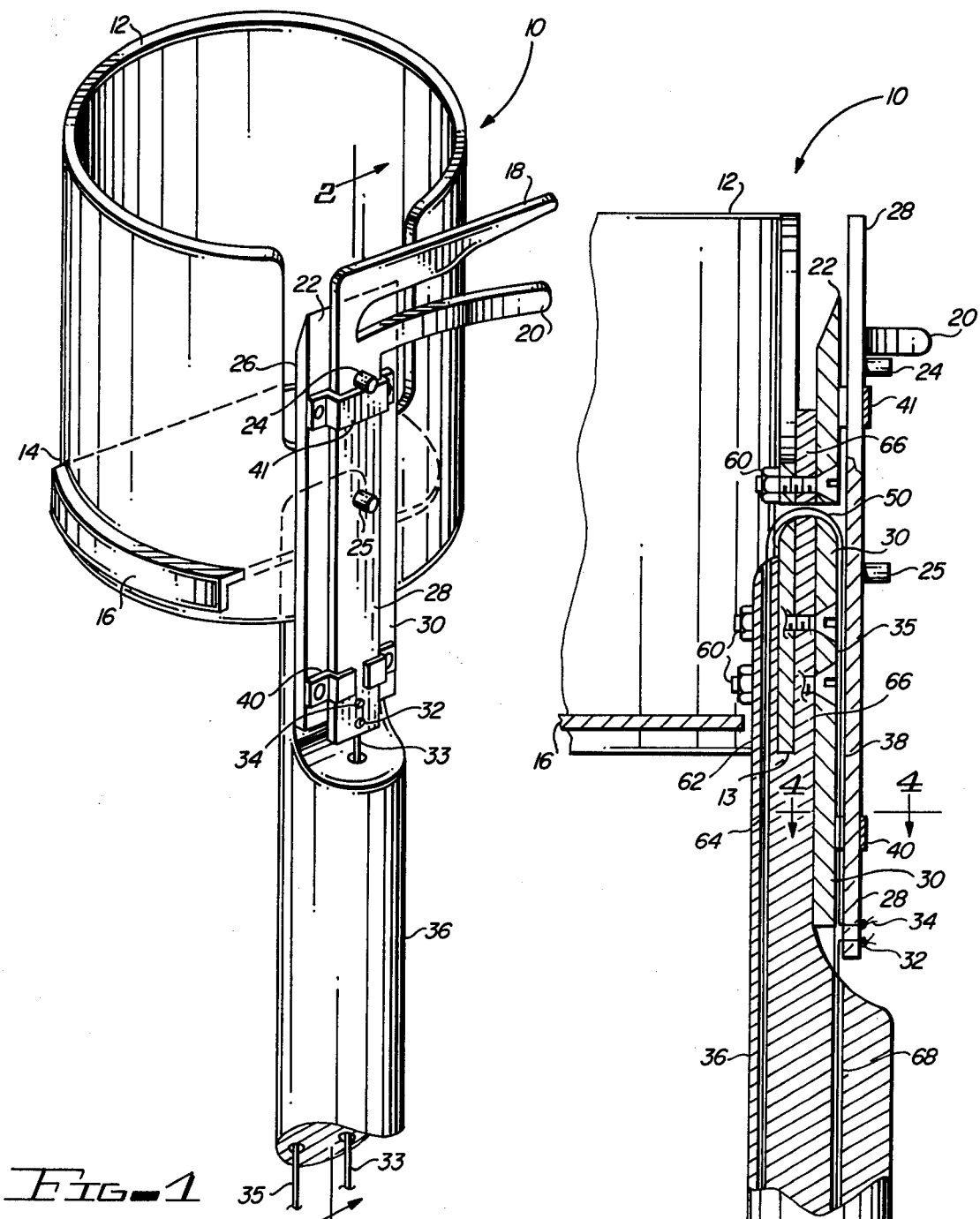
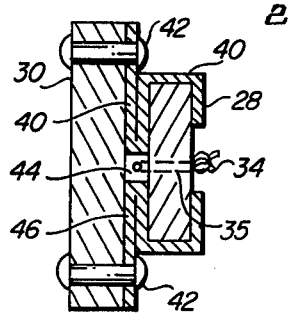
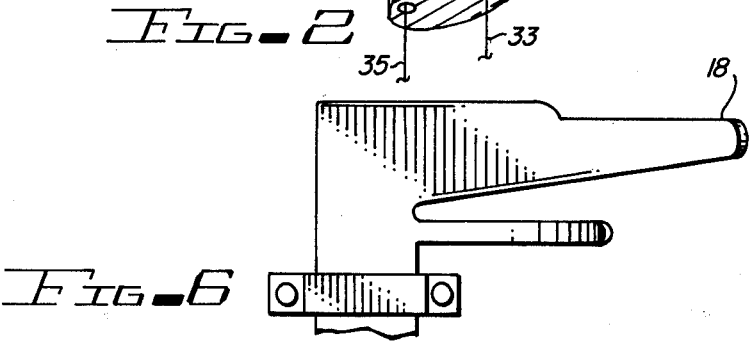

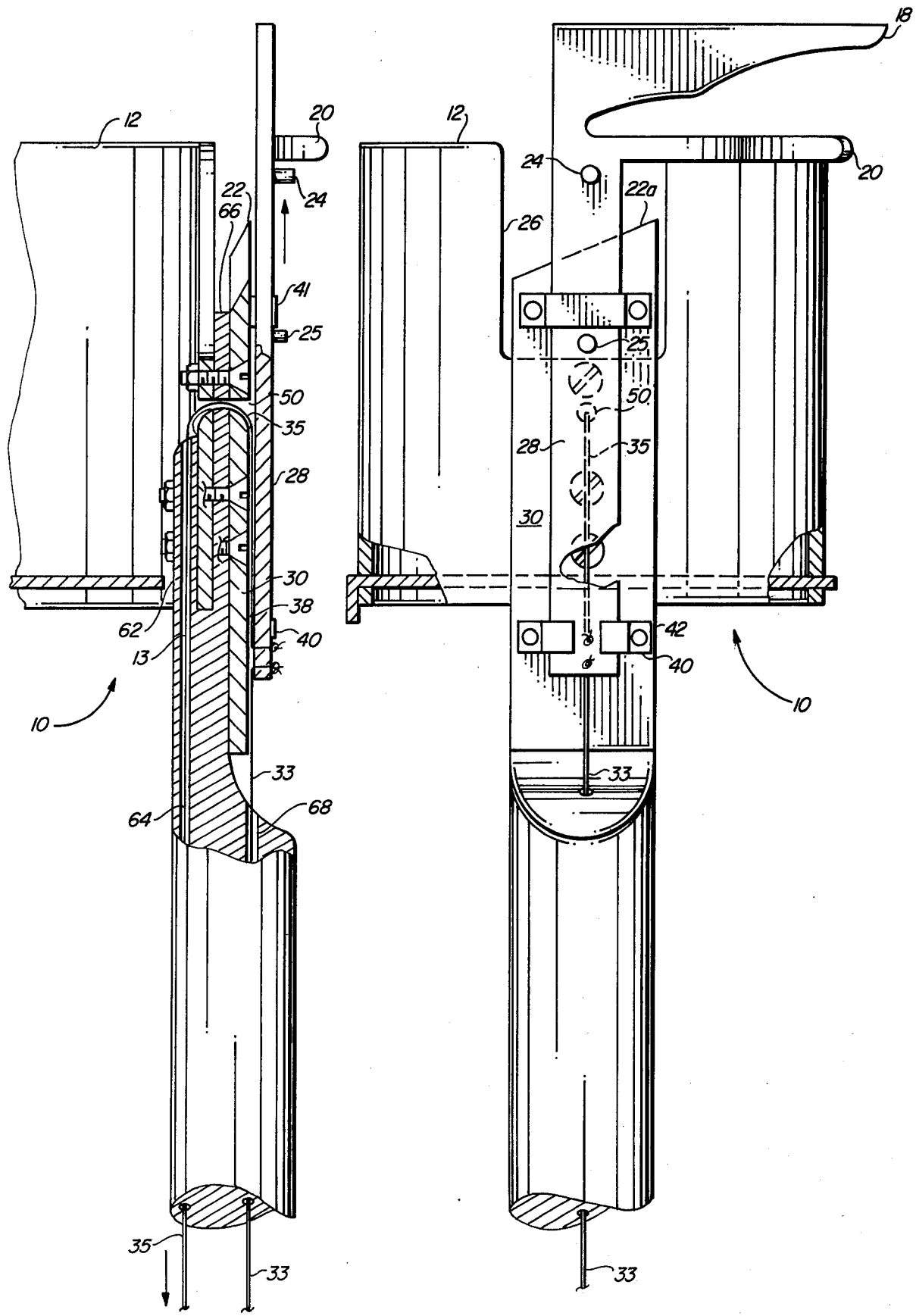

TOOL AND METHOD FOR PICKING FRUIT

BACKGROUND OF THE INVENTION

1. Field of The Invention

This invention relates generally, to an apparatus for picking fruit and to a method for using the apparatus and, more particularly, to apparatus and method for removing fruit from a tree by severing the fruit from its associated stew.

There are a number of tools available for picking fruit, and especially for picking fruit such as the various citrus fruits, from a tree. These tools are generally of the type having a cuplike fixture on the end of a pole or handle. To remove fruit using these tools, the cup is placed under or in contact with the fruit and then an attempt is made to wrench the fruit from the tree. Such tools and methods are all unsatisfactory, especially when the fruit and its stem is still firmly attached to the tree. Because the fruit merely sits in the cup-like fixture, then is no effective way to pull the fruit free from the tree. In attempting to remove the fruit from the tree by forcing the fixture against the fruit and/or by shaking the tool, the fruit being removed may be bruised or otherwise damaged by contact with the cup and other fruit on the same branch may be shaken loose and knocked to the ground where it is damaged on impact.

Additionally, because the fruit merely sits in the prior art fixture and is not otherwise held, there is a danger that some fruit which is successfully removed from the tree will be dropped before the user can lower the tool and remove the fruit from the cup. This danger is especially present when a tool designed to accomodate large fruit such as grapefruit is used to pick small fruit such as lemons or limes.

My previously filed application is an improvement over the above described prior art tools in that it includes a plurality of spring loaded fingers which can surround and capture or hold a piece of fruit, thereby negating the danger that some fruit may be dropped after removal. A releasable cable is used to control and bend these fingers inwardly to a position surrounding and capturing the desired piece of fruit. However, in accordance with the invention disclosed in the copending application, once the piece of fruit was captured it was still commonly necessary to tug at and pull more firmly attached pieces of fruit thereby causing fruit on the same branch to be shaken loose and knocked to the ground. Further, it was required to individually remove the fruit from the grasp of the spring loaded fingers.

Accordingly, a need still existed to develop a fruit picking apparatus, and a method for using that apparatus, which would overcome the problems of prior art tools and methods, thereby allowing fruit to be easily picked with high yield and without damage to the fruit.

SUMMARY OF THE INVENTION

It is therefor an object of the invention to provide an improved apparatus for picking fruit.

It is another object of this invention to provide an improved method for picking fruit.

It is another object of this invention to provide an improved fruit picking apparatus for removing fruit firmly attached to the fruit tree.

It is another object of this invention to provide an improved fruit picking apparatus which channels the stem portion of the fruit and cuts, or severs, the stem portion therefrom.

It is another object of this invention to provide an improved fruit picking apparatus which prevents the fruit from falling to the ground after being severed from a branch.

It is another object of this invention to provide an improved fruit picking apparatus which allows plural pieces of fruit to be picked and collected without requiring the apparatus to be unloaded.

Accordingly, an apparatus is provided for removing fruit from a fruit-bearing plant. The apparatus includes an elongate handle for extending the apparatus. A bracket bar is coupled to the extended end of the handle and slidably retains a guide-arm for engaging the fruit. The guide-arm is controlled by an operating means comprising a raising string for elevating the guide arm and lowering string for lowering the guide arm. A cutting edge is provided for severing the fruit from its associated stem. The cutting edge is actuated by the sliding action of the guide-arm as controlled by the operating means.

In accordance with a preferred embodiment of the invention, a basket or storage container may be attached proximate the extended end of the handle for receiving and storing fruit after being severed by the cutting edge; thereby eliminating the need to catch the fruit after it has been severed, and further allowing plural fruit to be picked before needing to lower the handle.

The guide-arm is provided with a toothed guide-head having an upper tooth and a spaced lower tooth which define a fruit stem channel. The guide-head is utilized to position and guide the stem of the desired fruit between the upper tooth and the lower tooth thereby facilitating the severing operation.

Thus, a method for utilizing the above apparatus to pick fruit from a tree by severing the fruit from an associated stem comprises the steps of: extending the apparatus to a position proximate the desired fruit; pulling on a raising string to raise a guide-arm to an elevated position; guiding the stem of the fruit into a channel defined by a toothed head on the guide-arm; pulling on a lowering string to lower the guide-arm to a retracted position; and severing the fruit from the associated stem by bringing the stem in contact with a cutting edge as the guide-arm is lowered. Additionally, the method may further comprise the step of collecting the severed fruit in a storage container.

The above and other objects and advantages of the invention will be better understood from the description of the preferred embodiment below, read in conjunction with the drawing.

BRIEF DESCRIPTION OF THE DRAWINGS

FIG. 1 is a perspective view of the fruit picking tool in a lowered position.

FIG. 2 is a side partial sectional view of the fruit picking apparatus along the line 2—2 of FIG. 1.

FIG. 3 is the side partially sectional view of FIG. 2 with the fruit picking tool is in an elevated position.

FIG. 4 is a sectional view taken along the line 4—4 of FIG. 2 showing the bracket which permits the guide arm to vertically slide along the bracket bar.

FIG. 5 is a planar view of the fruit picking apparatus shown in FIG. 3, but displaying an angled rather than horizontal cutting edge.

FIG. 6 is a planar view of an alternate embodiment of the toothed head of the above described fruit picker.

DESCRIPTION OF THE PREFERRED EMBODIMENT

Referring to FIGS. 1, 2 and 4, a fruit picking apparatus is generally designated by the reference numeral 10. The fruit picking apparatus 10 includes an elongated handle or shaft 36, only part of which is shown coupled at an upper end portion to a fruit basket 12 and a bracket bar 30. The fruit basket 12 is preferably hollow, permitting two prongs 62 and 66 from the elongated handle 36 to encase a specific wall portion 13 of the fruit basket 12. The two prongs 62 and 66 from the elongated handle 36 specific wall portion 13 of the fruit basket 12, and bracket bar 30 are then firmly coupled together, as by recessed screws and nuts 60. The bracket bar 30 forms a sharp cutting edge 22 at its uppermost portion. At least one bracket and preferably two brackets 40, 41 are coupled to the bracket bar by rivots 42. The brackets 40 and 41 permit a guide arm 28 to slide therethrough in a vertical and adjacent manner with respect to the bracket bar 30.

The upper end of the guide arm 28 forms a toothed head 19 including an upper tooth 18 and an outwardly curved lower tooth 20. The teeth 18 and 20 can engage a stem portion of the fruit when the guide arm 28 is in an elevated position as shown in FIG. 3. This is accomplished by properly positioning the fruit picking tool 10 so that the stem portion of the fruit (not shown) is channeled between the teeth 18 and 20 with the fruit portion located generally above the fruit basket 12. The curvature of the lower tooth 20 makes the task of engaging the stem portion of the fruit between the teeth 18 and 20 relatively easy and quick. Once the fruit has been properly positioned and the stem portion engaged, the guide arm 28 may be slid downwardly to a rest or cutting position as shown in FIGS. 1 and 2. The downward motion brings the engaged stem over the cutting edge 22 of the bracket bar 30 whereupon the stem is severed and the fruit softly drops into the fruit basket 12. The fruit basket 12 may remain hollow so as to permit the fruit to drop therethrough and into a collecting bag. Alternatively, the fruit basket 12 may include an emptying tray 16 which slides into horizontal slots 14 in the fruit basket 12 so as to capture or hold the fruit within the fruit basket 12 for a desired length of time, as for example until the fruit basket 12 is full.

Because the stem is severed, it is not necessary to shake the piece of fruit to remove or pick it from the tree as it was with prior art type tools, and thus there is not danger of shaking loose other fruit on the same branch. With the present invention, there is little chance of other fruit on the tree becoming damaged due to a fall, and the picked fruit rests safely in the fruit basket 12 after being removed from the tree.

Referring additionally to FIGS. 3 and 5 the vertical motion of the guide arm 28 to the elevated position shown in FIG. 3 from the rest or cutting position shown in FIG. 2, or vice versa, is manually controlled by a raising string 35 and a lowering string 33. The lowering string 33 is knotted 32 at one end through a hole in the guide arm 28. The other controlling end of the lowering string 33 runs downwardly through and out a cavity 68 in the controlling end of the lowering string 33. Thus, the lowering string 33 pulls the guide arm 28 in a downward direction through the brackets 41, 42 into the rest portion. The raising string 35 is knotted 34 at one end through a hole in the guide arm 28. The other, controlling end of the raising string 35 runs upwardly along the back of the guide arm 28 through the gap 38, shown clearly in FIGS. 2 and 3, created by the doubled over spacing means 46 of the bracket 40 which separates the bracket bar 30 from the guide arm 28. The raising string 35 passes through the bracket 40 by means of a passage 44 therein as shown in FIG. 4. The controlling end of the raising string 35 then passes through an opening 50, shown in FIG. 5, in the bracket bar 30. The raising string 35 continues through a passage 64 in the prong portion 66 of the elongated handle 36 and in the specific wall portion 13 of the fruit basket 12. The string exits the passage 64 at the end of the elongated handle 36. A downward pull on the controlling end of the raising string 35, as shown in FIG. 3, will raise the guide arm 28 to an elevated position. The opening 50 is preferably smooth and rounded so as not to cause chaffing of the raising string 35. Although the controlling ends of the strings 33 and 35 are shown to pass through cavities in the solid elongated handle, they could equally well run through a hollow elongated handle, or altogether outside of the elongated handle. The strings are preferably color coated to permit the rapid identification of each string.

Referring to FIG. 5, a planar view of the fruit picking tool 10 is shown. The tool 10 may have a stop 25 to mark the elevated position of the guide arm and a stop 24 to mark the rest position. It may also be preferable to have an angled cutting edge 22a so as to force the engaged stem tightly between the teeth of the toothed head 19 during the cutting motion. In an alternate embodiment, the fruit basket 12 may have a groove 26 therein so that the cutting edge 22a of the bracket bar 30 may rest safely below the top edge of the fruit basket so as to prevent the operator from accidentally cutting himself.

Finally, referring to FIG. 6 an alternate embodiment of the toothed head of the guide arm is disclosed with a more pronounced and elongated upper tooth 18 which should make it even easier to properly engage the fruit stem. With such a head, it is not necessary for the lower tooth to be curved outwardly.

Thus, it is apparent that there has been provided, in accordance with the invention, an apparatus and method for picking fruit that meets the objections set forth above. While the invention has been described and illustrated with reference to specific embodiments thereof, it is not intended that the invention be so limited. Those skilled in the art will recognize, after review of the foregoing detailed description, that variations and modifications may be made therein without departing from the spirit and scope of the invention. For example, a spring can be attached to the stop 25 and to the outside of the bracket 41 to permit the return or upward movement of the guide arm 28 after a cutting operation. Also, if desired, a hinge can be placed across the portion of the guide arm 28 just below the lower tooth 20 in order to provide increased flexibility in grasping the fruit. Furthermore, using the hinge feature, the tooth 18 and the tooth 20 can be shaped to extend with the opening between them extending to the left rather than to the right as shown in the drawings.

What is claimed is:

1. An apparatus for removing fruit from a fruitbearing plant comprising, in combination:
   (a) elongated handle means for handling and extending said apparatus;
   (b) a bracket bar coupled to an extended end of said handle means, said bracket bar forming a cutting implement at its uppermost edge, said bracket bar including upper and lower spacing brackets operably secured to said bracket bar by rivets;

(c) guide-arm means slidably retained by said bracket bar for engaging and guiding said fruit into a desired position, said guide-arm means being operably engaged by said spacing brackets which retain said guide-arm means in a parallel position to and at a spaced distance from said bracket bar, said guide-arm means comprising a toothed guide head having an upper tooth and a spaced lower tooth which define a stem channel, said guide head being utilized to position and guide a stem of said fruit between said upper tooth and lower tooth to thereby facilitate severing said fruit from said stem by said cutting means;

(d) operating means for controlling the operation of said guide-arm means comprising raising means for controllably elevating said guide arm means to an extended position to engage and guide said fruit, said raising means comprising a raising string operated by hand which is operably contained within said elongated handle means and lowering means for controllably returning said guide-arm means to a retracted position to activate a cutting means to sever said fruit from its associated stem, said lowering means comprising a lowering string operated by hand which is operably contained within said elongated handle means;

(e) cutting means for severing said fruit from its associated stem, said cutting means being actuated by said sliding action of said guide-arm means ; and (f) basket means coupled to said extended end of said handle means for receiving and storing said fruit after being severed by said cutting means, said basket means comprising a basket having an emptying tray at the bottom of said basket that may be opened and shut which slides into horizontal slots operably attached to said basket.

2. An apparatus for picking fruit from a tree by severing said fruit from an associated stem comprising, in combination;

(a) elongated handle means for handling and extending said apparatus to reach said fruit, said handle means including plural prongs at an extended end thereof for engaging a basket means, at least one of said plural prongs being located within the volume of said basket means and at least one other of said plural prongs being located outside of said basket means and opposite said prong located within the volume of said basket means, said inside handle prong defining a channel therethrough which continues through the length of said elongated handle means, said outside prong cooperating with said basket means and a bracket bar to define an opening having a smooth and curved lower surface, said elongated handle means defining a second channel passing through the length of said elongated handle means;

(b) an elongated bracket bar fastened to said extended end of said handle means, said bracket bar forming a cutting implement at its upper most edge, said bracket bar includes upper and lower spacing brackets slidably engaging and retaining said guide-arm means in a parallel position at a spaced distance from said bracket bar, said lower spacing bracket defining a channel between said guide-arm means and said bracket bar;

(c) guide-arm means slidably coupled to said bracket bar, said guide-arm means including a toothed guide head having an upper tooth and a spaced lower tooth which define a stem channel through which the stem of a fruit is guided;

(d) operating means including (i) raising means for controllably elevating said guide-arm means to an extended position to engage said guide head with said fruit, and (ii) lowering means for controllably returning said guide-arm to a retracted position and for causing said fruit to be severed from its associate stem by said cutting implement at the uppermost edge of said bracket bar, said raising means comprising a raising string operated by hand and (i) coupled at one end to a lower end of said guide-arm means, (ii) passing through said channel defined by said lower spacing bracket, (iii) passing through said smooth opening defined by said basket means, bracket bar and outside handle prong, (iv) passing through said channel in said inside prong and said elongated handle means, and (v) exiting said channel in said handle means through an out located at said lower end thereof, whereby pulling on said raising string causes said guide-arm means to be raised to an elevated position, said lowering means comprises a lowering string operated by hand and (i) coupled to said lower end of said guide-arm means (ii) passing through said second channel defined by said handle means, and (iii) exiting said second channel in said handle means at an out located at said lower end thereof, whereby pulling on said lowering string causes said guide-arm means to be returned to a retracted position; and (e) basket means coupled to said extended end of said handle means for receiving and storing said fruit after said fruit has been severed from said associate stem, said basket means comprising a basket having an emptying tray at the bottom of said basket that may be opened and shut which slides into horizontal slots operably attached to said basket.

* * * * *